US009188791B2

(12) United States Patent
Ishii

(10) Patent No.: US 9,188,791 B2
(45) Date of Patent: Nov. 17, 2015

(54) ELECTRONIC BINOCULARS

(75) Inventor: Shinji Ishii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1272 days.

(21) Appl. No.: 12/485,201

(22) Filed: Jun. 16, 2009

(65) Prior Publication Data

US 2009/0315808 A1 Dec. 24, 2009

(30) Foreign Application Priority Data

Jun. 18, 2008 (JP) ................................. 2008-159726

(51) Int. Cl.
| H04N 5/232 | (2006.01) |
| G02B 27/64 | (2006.01) |
| G02B 7/10 | (2006.01) |
| G02B 7/30 | (2006.01) |
| G02B 23/18 | (2006.01) |
| H04N 5/225 | (2006.01) |

(52) U.S. Cl.
CPC .............. *G02B 27/646* (2013.01); *G02B 7/102* (2013.01); *G02B 7/30* (2013.01); *G02B 23/18* (2013.01); *H04N 5/2251* (2013.01); *H04N 5/23212* (2013.01); *H04N 5/23248* (2013.01); *H04N 5/23254* (2013.01); *H04N 5/23258* (2013.01); *H04N 5/23267* (2013.01)

(58) Field of Classification Search
CPC ............ G06T 2207/10016; G06T 7/20; G06T 7/2033; H04N 5/145; H04N 9/12; G09G 2300/026; G02G 1/3336; G06F 3/1446
See application file for complete search history.

(56) References Cited

U.S. PATENT DOCUMENTS

| 5,959,769 | A | 9/1999 | Yoneyama |
| 2003/0231393 | A1 | 12/2003 | Yamamoto et al. |
| 2003/0231787 | A1* | 12/2003 | Sumi ............................. 382/103 |
| 2004/0145655 | A1* | 7/2004 | Tomita ............................ 348/51 |
| 2004/0212776 | A1* | 10/2004 | Spitzer et al. ................... 351/41 |
| 2004/0246576 | A1* | 12/2004 | Mogamiya ..................... 359/407 |
| 2005/0163355 | A1* | 7/2005 | Mertens ........................ 382/128 |
| 2007/0242937 | A1 | 10/2007 | Sano et al. |
| 2009/0160957 | A1* | 6/2009 | Deng et al. ............... 348/208.99 |

FOREIGN PATENT DOCUMENTS

| EP | 0 636 916 A1 | 2/1995 |
| JP | 03-0916931 | * 3/1991 |
| JP | 03-096931 A | 4/1991 |
| JP | 09-061729 A | 3/1997 |
| JP | 10-062674 A | 3/1998 |
| JP | 2001-160958 A | 6/2001 |
| JP | 2002-116386 A | 4/2002 |

(Continued)

*Primary Examiner* — Andrew Sasinowski
*Assistant Examiner* — Mihir Rayan
(74) *Attorney, Agent, or Firm* — Hazuki International, LLC

(57) ABSTRACT

An electronic binoculars includes: first and second imaging units with a predetermined horizontal distance therebetween disposed in a housing; optical members that guide image light beams to the first and second imaging units; a sensor that detects angular acceleration or acceleration acting on the housing; an image processor that processes image signals produced by the first and second imaging units and corrects the image signals in terms of the change in motion of the housing in accordance with the angular acceleration or acceleration detected by the sensor; and first and second displays with a horizontal distance therebetween disposed in the housing, the first and second displays displaying the image signals processed by the image processor.

17 Claims, 16 Drawing Sheets

EXAMPLE OF FOCUS CONTROL

(56) References Cited

FOREIGN PATENT DOCUMENTS

| | | | |
|---|---|---|---|
| JP | 2004-032084 A | 1/2004 | |
| JP | 2004-133185 | 4/2004 | |
| JP | 2004-133185 A | 4/2004 | |
| JP | 2004133185 A * | 4/2004 | ............ G02B 23/00 |
| JP | 2005-197862 A | 7/2005 | |
| JP | 2007-235532 A | 9/2007 | |

* cited by examiner

EXAMPLE OF FOCUS CONTROL

EXAMPLE OF HAND-SHAKE CORRECTION

EXAMPLE OF LINEAR SLIDING MECHANISM

PRINCIPLE OF AUTOFOCUS CONTROL

1 DISPLAYED IMAGE

2 DISPLAYED IMAGE

PRINCIPLE OF AUTOMATIC IDENTIFICATION OF BACKGROUND AND OBJECT

1 DISPLAYED IMAGE

2 DISPLAYED IMAGE (#1-#2) DISPLAYED IMAGE

PRINCIPLE OF AUTOMATIC IDENTIFICATION OF OBJECT NEIGHBORHOOD AND OBJECT

1 DISPLAYED IMAGE

2 DISPLAYED IMAGE (#1-#2) DISPLAYED IMAGE

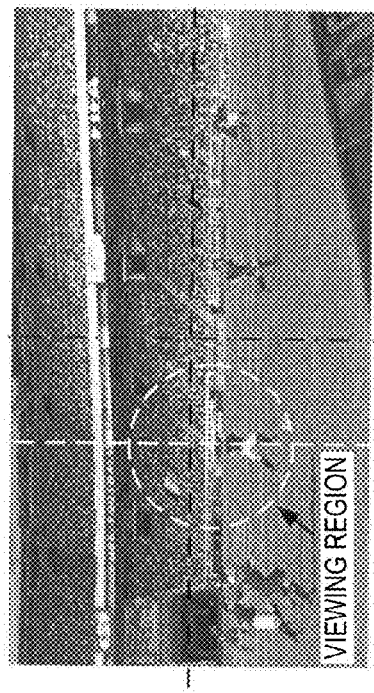
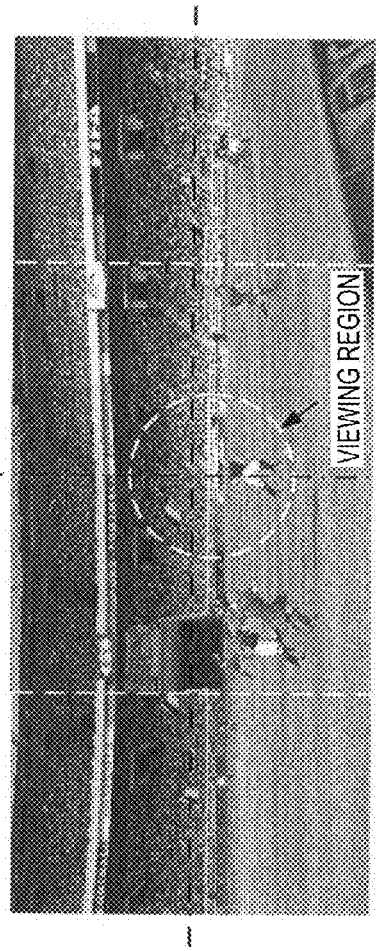
FIG13A LEFT VIDEO
FIG13B RIGHT VIDEO
FIG13C COMBINED VIDEO

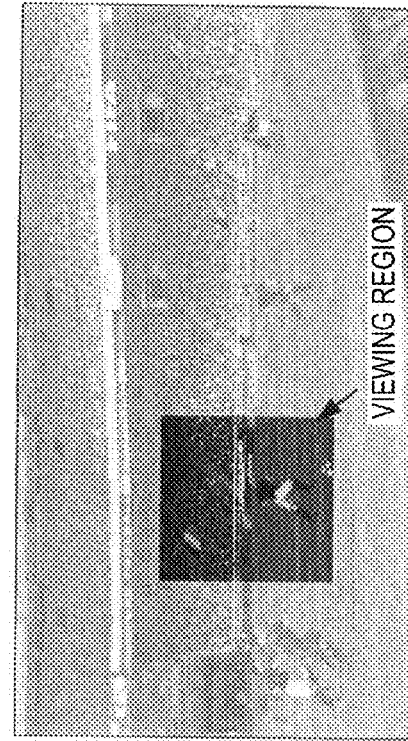
FIG14B EXTRACTION OF VIEWING REGION FROM RIGHT VIDEO
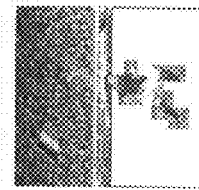
FIG14C BACKGROUND COLOR FILTERING PERFORMED ON VIEWING REGION IN RIGHT VIDEO
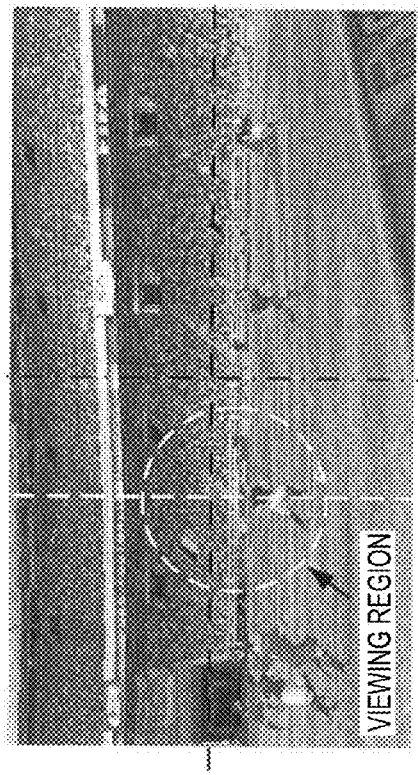
FIG14A RIGHT VIDEO

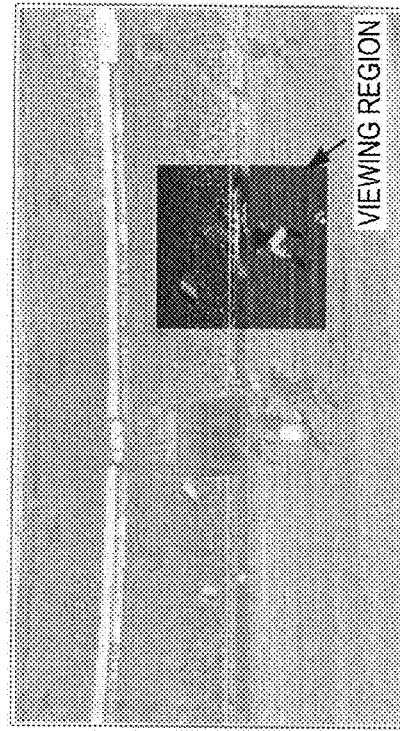
FIG15B EXTRACTION OF VIEWING REGION FROM LEFT VIDEO
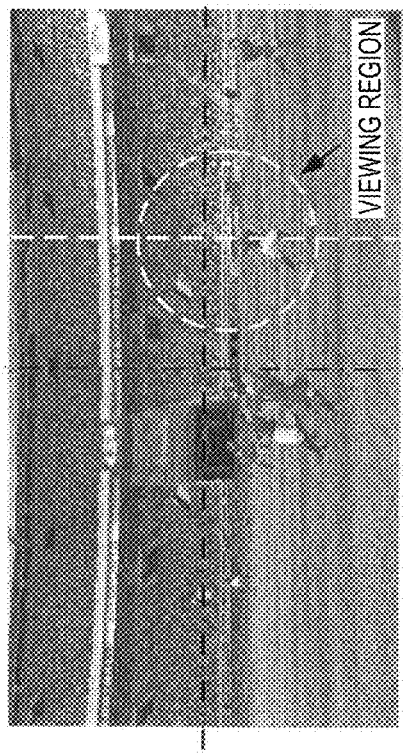
FIG15A LEFT VIDEO
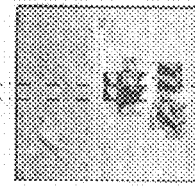
FIG15D DIFFERENCE DATA OBTAINED BY SUBTRACTING VIEWING REGION IN LEFT VIDEO FROM VIEWING REGION IN RIGHT VIDEO
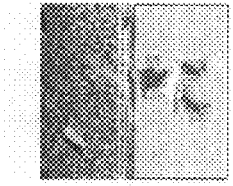
FIG15C BACKGROUND COLOR FILTERING PERFORMED ON VIEWING REGION IN LEFT VIDEO

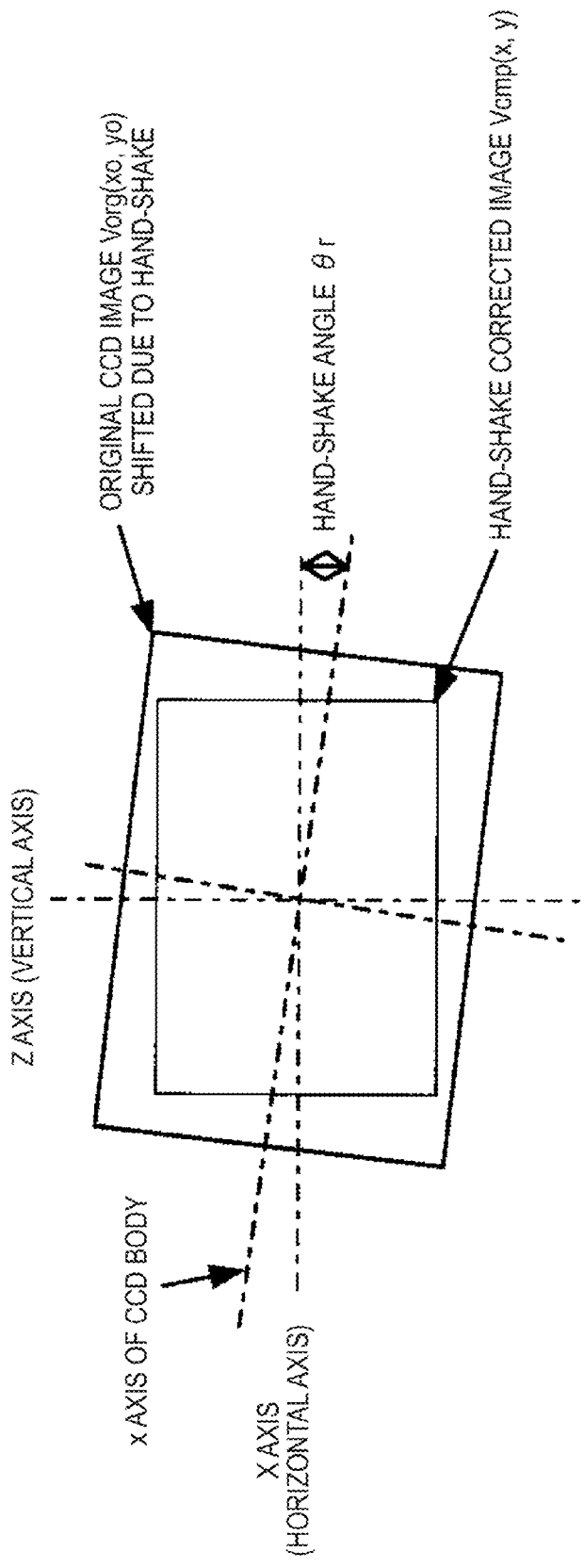

SENSORS AND COORDINATE DEFINITION IN BINOCULARS

CHANGE IN OBJECT IMAGE DUE TO HAND-SHAKE-RELATED SHIFT
(SMALL SHIFT AROUND YAW AXIS) OF BINOCULARS

DISPLAYED IMAGE PRODUCED WHEN
BINOCULARS ARE IN POSITION A

DISPLAYED IMAGE PRODUCED WHEN
BINOCULARS ARE IN POSITION B

CHANGE IN OBJECT IMAGE DUE TO HAND-SHAKE-RELATED SHIFT
(SHIFT IN X AXIS) OF BINOCULARS

DISPLAYED IMAGE PRODUCED WHEN
BINOCULARS ARE IN POSITION A

DISPLAYED IMAGE PRODUCED WHEN
BINOCULARS ARE IN POSITION C

CHANGE IN OBJECT IMAGE DUE TO HAND-SHAKE-RELATED SHIFT
(SHIFT IN X AXIS) OF BINOCULARS

DISPLAYED IMAGE PRODUCED WHEN BINOCULARS ARE IN POSITION A

NON-CORRECTED DISPLAYED IMAGE PRODUCED WHEN BINOCULARS ARE IN POSITION C

CORRECTED DISPLAYED IMAGE PRODUCED WHEN BINOCULARS ARE IN POSITION C

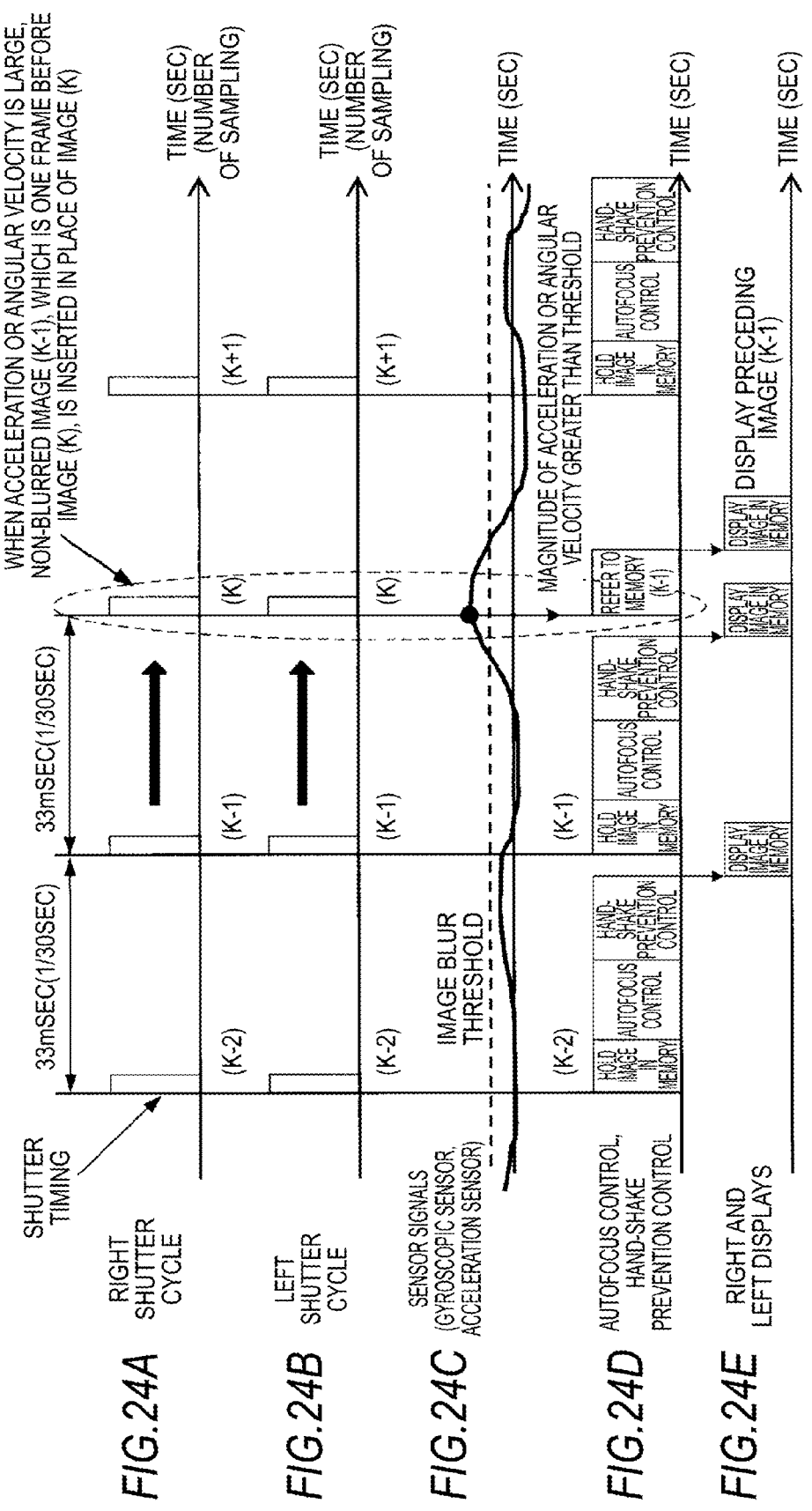

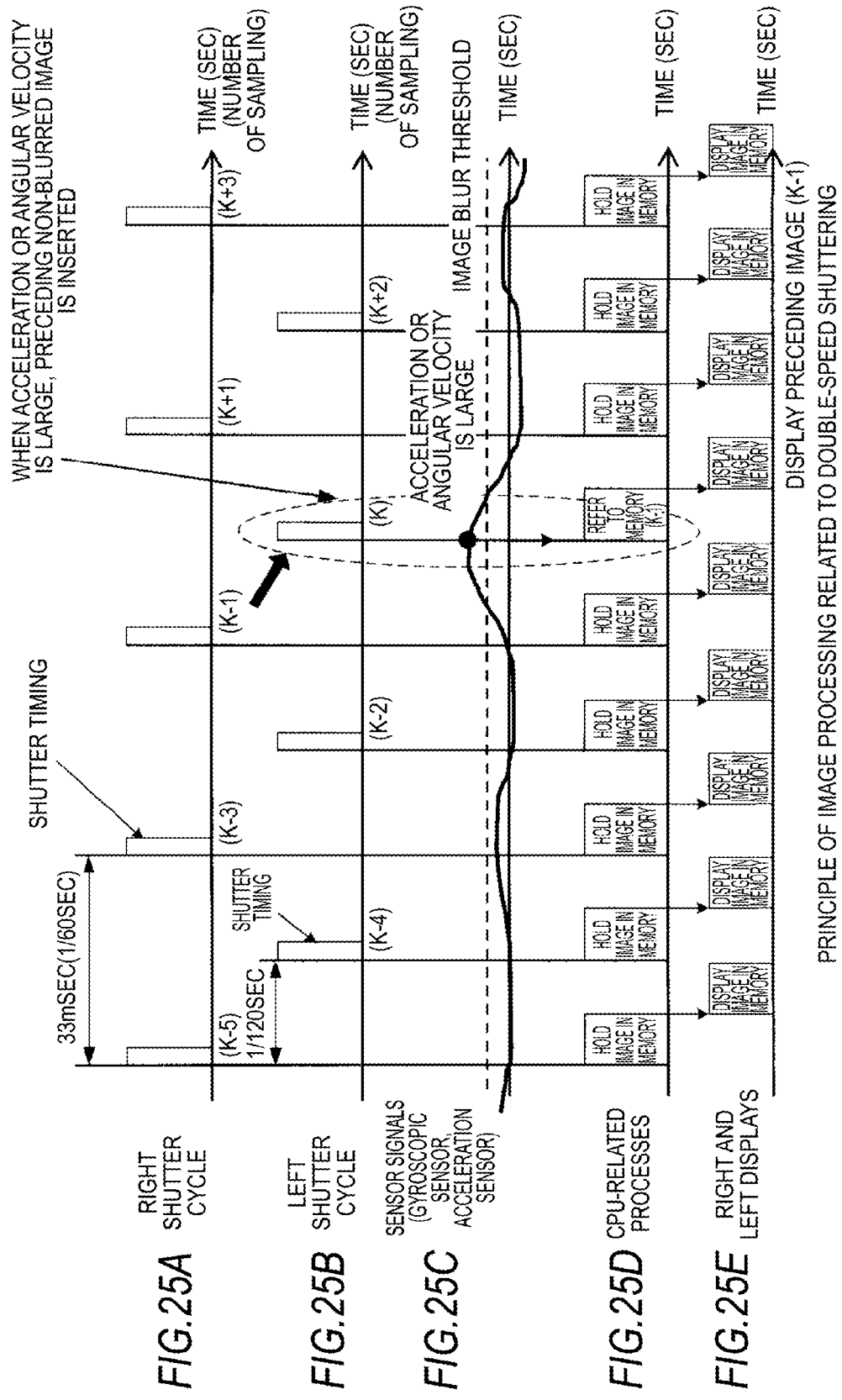

ELECTRONIC BINOCULARS

BACKGROUND OF THE INVENTION

1. Field of the Invention

The present invention relates to binoculars used by a user to view an enlarged remote scene or other objects with both eyes, and particularly to electronic binoculars that digitizes and displays images captured through imaging systems.

2. Description of the Related Art

There has been an apparatus developed or proposed as what is called digital binoculars including imaging units that convert image light beams into electric image signals and display units that display the images captured by the imaging units. The binoculars of this type are suitable to view a stationary subject or a nearly stationary subject.

That is, each of the imaging units includes an optical system, such as a lens having a relatively high magnification, enlarges and displays a remote, stationary subject, and shows the enlarged subject to a user who wears the digital binoculars. Since digital processing can be performed on the image signals, a variety of image processing operations can be carried out. For example, images captured in a dark environment are brightened before displayed, or hand-shake correction (the "hand-shake" used herein refers to a shake caused by hands) is made, as performed in a digital video camcorder.

JP-A-2004-133185 discloses an example of the electronic binoculars of this type.

SUMMARY OF THE INVENTION

The reason why such proposed electronic binoculars are used to view stationary objects is that when a moving object is viewed, it is difficult to continuously keep the object in focus even when the user tries to follow the moving object and keep it within the field of view.

That is, when an autofocus capability is equipped, for example, it is possible to some extent to follow a moving object and keep it in focus. However, consider a case where a relatively large area in a stadium where soccer or any other similar sport competition is in progress. When the user continuously follows a player, as a subject, moving across the large playing field, simply bringing the subject into focus by using an autofocus technology used in a video camcorder of related art may not be good enough to obtain images with the subject being in sharp focus. Specifically, another player in the field of view may be in focus, and which player in the field of view will be in focus disadvantageously depends on the conditions at the time of imaging.

Further, a hand-shake correction mechanism equipped in a video camcorder of related art is designed to provide a stable image by simply preventing the image being captured from being blurred due to a hand-shake. When such hand-shake correction is combined with the action of following a moving object, images viewed through the binoculars may not necessarily be appropriate.

While the above description has been made with reference to autofocusing and hand-shake correction, there have been a variety of problems with other features as well as focusing when these features are applied to electronic binoculars or image processing used in a video camcorder of related art is applied to these features.

Thus, it is desirable to provide electronic binoculars capable of comfortably viewing a moving subject.

An electronic binoculars according to an embodiment of the invention includes first and second imaging units with a predetermined horizontal distance therebetween disposed in a housing, optical members that guide image light beams to the first and second imaging units, a sensor that detects angular acceleration or acceleration acting on the housing, and an image processor. The image processor processes image signals produced by the first and second imaging units and corrects the image signals in terms of the change in motion of the housing in accordance with the angular acceleration or acceleration detected by the sensor. The embodiment further includes first and second displays with a horizontal distance therebetween disposed in the housing, and the first and second displays display the image signals processed by the image processor.

According to the embodiment of the invention, using image signals produced by the two imaging units to make motion correction in the image processor allows motion correction equivalent to what is called hand-shake correction on the housing to be made. In this case, using image signals produced by the two imaging units disposed with a horizontal distance therebetween to perform image processing allows sophisticated image processing suitable for the electronic binoculars to be performed.

According to the embodiment of the invention, using image signals produced by the two imaging units disposed with a horizontal distance therebetween to perform image processing in the image processor allows sophisticated image processing suitable for the electronic binoculars to be performed. For example, even when the electronic binoculars are inclined, motion correction can be made on the displayed images in such a way that the horizontal lines are kept oriented in a fixed direction. Alternatively, the image processor can extract only a subject of interest and display an image with the background removed.

BRIEF DESCRIPTION OF THE DRAWINGS

FIGS. 1A and 1B are cross-sectional views showing an exemplary configuration of electronic binoculars according to an embodiment of the invention, wherein FIG. 1A is a transverse cross-sectional view and FIG. 1B is a longitudinal cross-sectional view;

FIGS. 13A and 13B explain exemplary right and left images to which the processes of the embodiment of the invention are applied, and FIG. 13C explains an exemplary combined image;

FIGS. 14A and 14B explain exemplary right and left images to which the processes of the embodiment of the invention are applied, and FIG. 14C explains an exemplary combined image;

FIGS. 15A and 15B explain exemplary right and left images to which the processes of the embodiment of the invention are applied, and FIGS. 15C and 15D explain an exemplary combined image;

FIG. 16 is explains the principle of the image processing related to the hand-shake correction according to the embodiment of the invention;

FIGS. 24A to 24E are time sequence diagrams used in an example of image processing (autofocusing and hand-shake correction) performed in the electronic binoculars according to the embodiment of the invention; and FIGS. 25A to 25E are time sequence diagrams used in another example of image processing (using a previous image) performed in the electronic binoculars according to the embodiment of the invention.

DESCRIPTION OF THE PREFERRED EMBODIMENTS

An exemplary embodiment of the invention will be described below with reference to the accompanying drawings.

Figure 2:
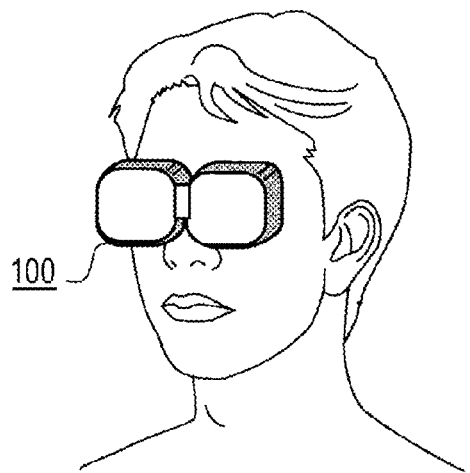
FIG. 2 explains an example showing how to wear the electronic binoculars according to the embodiment of the invention.

Electronic binoculars 100 according the present exemplary embodiment are integrally incorporated in a housing 120, and a user wears the electronic binoculars 100, when using it, on the face in front of the right and left eyes, for example, as shown in FIG. 2. Although FIG. 2 does not particularly show any mechanism for allowing the user to wear the electronic binoculars 100 on the face, the user may wear the electronic binoculars 100 like glasses, or may hold the electronic binoculars 100 in the user's hands like typical binoculars.

Figure 1A:
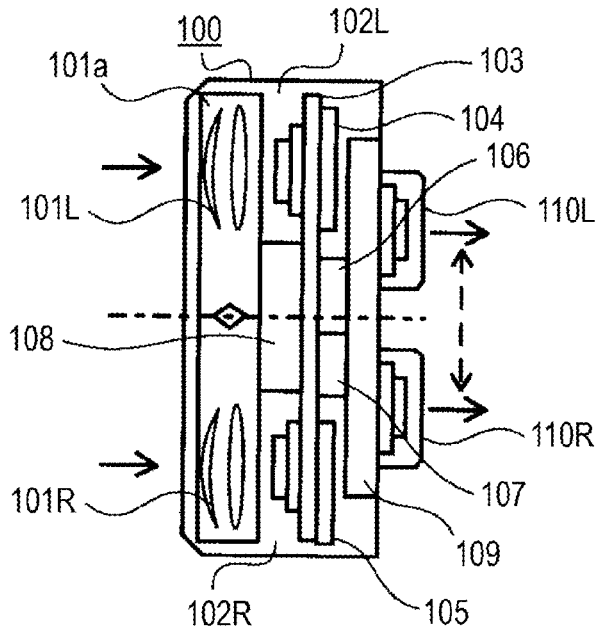
Figure 1B:
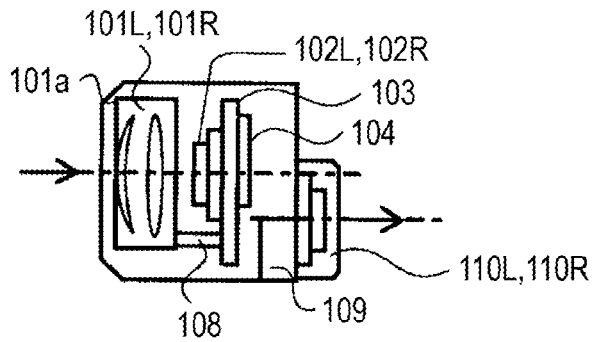

FIGS. 1A and 1B are cross-sectional views showing the internal configuration of the electronic binoculars 100 according to the present exemplary embodiment. FIG. 1A is a transverse cross-sectional view taken along the horizontal direction (transverse direction), and FIG. 1B is a longitudinal cross-sectional view taken along the vertical direction (longitudinal direction).

The housing 120 of the electronic binoculars 100 houses a lens fixing mount 101a on the front side of the housing 120. The lens fixing mount 101a contains right and left lens systems 101L, 101R with a predetermined distance therebetween in the horizontal direction (transverse direction). Image light beams produced by the lens systems 101L and 101R are picked up by right and left imaging units 102L, 102R and converted into electric image signals. Each of the lens systems 101L and 101R is formed of a plurality of lenses including a focus lens, and moving the focus lens along the optical axis allows focus adjustment. Each of the lens systems 101L and 101R forms what is called a zoom lens the focal length of which can be changed. The zoom magnification that is typically used ranges from 2 to 10.

The imaging units 102L and 102R can be a CCD (Charge Coupled Device) image sensor, a CMOS (Complementary Metal Oxide Semiconductor) image sensor, or any other suitable types of image sensors. A readout circuit suitable for the image sensor to be used is also provided. The distance between the two imaging units 102L and 102R is preferably at least several centimeters, which corresponds to the distance between the right and left eyes of the user who wears the electronic binoculars 100. The image sensor that forms each of the imaging units 102L and 102R has what is called a high-speed shuttering capability that allows the single-frame exposure period to be reduced.

The image signals produced by the right and left imaging units 102L, 102R are supplied to an image processor 104 and undergo a variety of image processing operations in the image processor 104 and its peripheral circuits. The imaging units 102L, 102R and the image processor 104 are disposed on the front or rear side of a substrate 103, on which a gyroscopic sensor 106 and an acceleration sensor 107 are also mounted. The outputs from the sensors 106 and 107 are used for hand-shake correction. The configuration for making the hand-shake correction will be described later in detail.

A linear motor 108 is attached to the substrate 103, and driving the linear motor 108 allows the focus lens in each of the lens systems 101L and 101R to be moved for focus adjustment. The right and left lens systems 101L, 110R are incorporated in the single lens fixing mount 101a and moved as a whole by the linear motor 108.

Right and left liquid crystal displays 110L, 110R are disposed with a predetermined distance therebetween on the rear side of the housing 120, and a sliding mechanism 109 is attached to the right and left liquid crystal displays 110L, 110R. The sliding mechanism 109 can adjust the horizontal distance between the two liquid crystal displays 110L and 110R. The detail of the adjustment mechanism will be described later. While the liquid crystal displays are used as a display means, the liquid crystal displays 110L and 110R may be replaced with any other suitable types of image displays.

Figure 3:
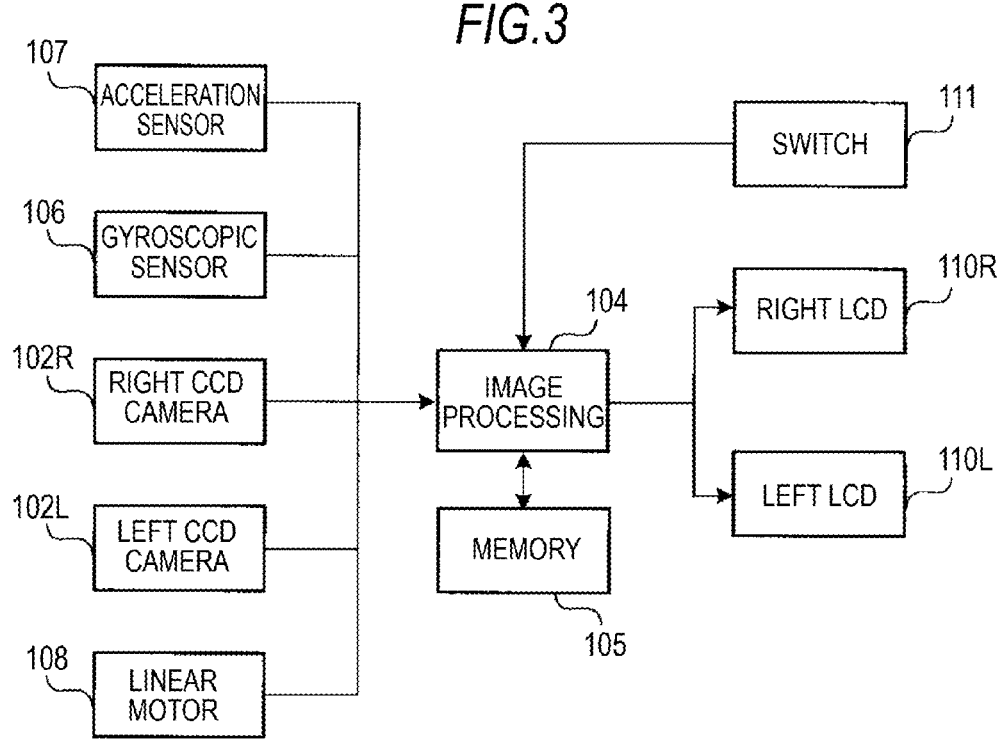
FIG. 3 is a block diagram showing an exemplary internal configuration of the electronic binoculars according to the embodiment of the invention.

FIG. 3 shows an exemplary overall configuration for performing the image processing in the electronic binoculars of the present embodiment.

As shown in FIG. 3, the image signals produced by the right and left imaging units 102L, 102R are supplied to the image processor 104, and the data are stored in a memory 105 connected to the image processor 104. In this process, image display signals are produced at the same time. The image processor 104 also serves as a controller when the image processing is performed. The produced image signals are supplied to and displayed on the right and left liquid crystal displays 110L, 110R. The image signals supplied to the right and left liquid crystal displays 110L, 110R may be used in either of the following two ways: Separate images representing the image signals captured by the right and left imaging units 102L, 102R are displayed, or a combined single image signal produced by image processing in the image processor 104 is supplied and displayed.

The outputs from the gyroscopic sensor 106 and the acceleration sensor 107 are supplied to the image processor 104, where image processing for hand-shake correction, which will be described later, is performed in accordance with the outputs from the sensors.

In accordance with a focus adjustment state detected in the image processor 104, a drive signal is supplied from the image processor 104 to the linear motor 108 to bring the image light beams captured by the imaging units 102L and 102R into focus.

A switch 111 is disposed at a predetermined location on the housing 120 of the electronic binoculars 100, and imaging and displaying-related processes are carried out by supplying operational instructions through the switch 111 to the image processor 104 and other components. Mode setting made by operating the switch 111 may be used to set whether or not hand-shake correction, which will be described later, and a variety of other image processing operations are carried out. The current mode setting may be displayed on the liquid crystal displays 110L and 110R.

An exemplary configuration for performing each of the image processing operations will be described below in detail.

First, the configuration for performing autofocus adjustment will be described with reference to FIG. 4.

Figure 4:
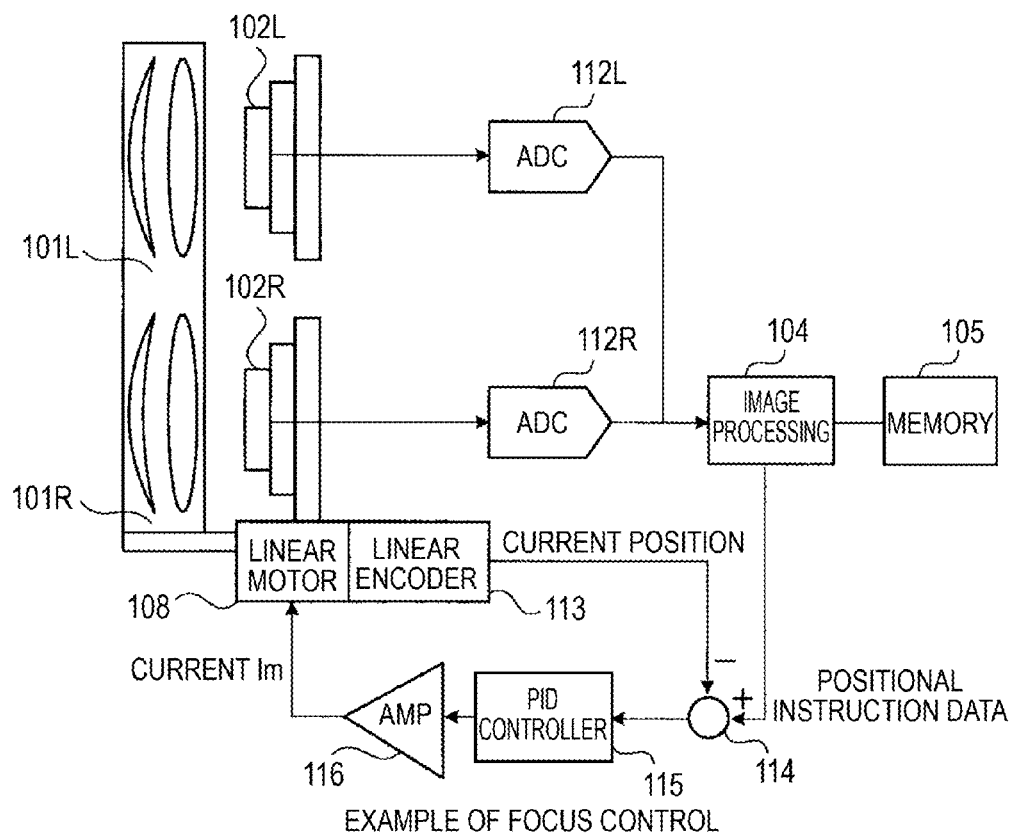
FIG. 4 is a block diagram showing an exemplary focus control configuration of the electronic binoculars according to the embodiment of the invention.

As shown in FIG. 4, the image signals produced by the right and left imaging units 102L, 102R are converted into digital image data by analog/digital converters (ADCs) 112L and 112R, respectively. The converted image data are supplied to the image processor 104 and temporarily stored in the memory 105 as necessary.

The image processor 104 extracts a target subject from the image data produced by the two imaging units 102L and 102R and calculates the distance to the target subject. The calculated position is used as a target focus position, and the target position data is supplied as positional instruction data to a subtracter 114, where the current position of the optical systems 101L and 101R detected by a linear encoder 113 is subtracted from the positional instruction, and the position to be provided to the linear motor 108 is calculated. The calculated positional data is supplied to a PID controller 115 to produce a drive signal for driving the linear motor 108, and the drive signal (drive current Im) is supplied to the linear motor 108 through an amplifier 116. The PID controller 115 is a control means that performs feedback control using three elements, the deviation from the target value, the integral value of the deviation, and the derivative value of the deviation.

Figure 5:
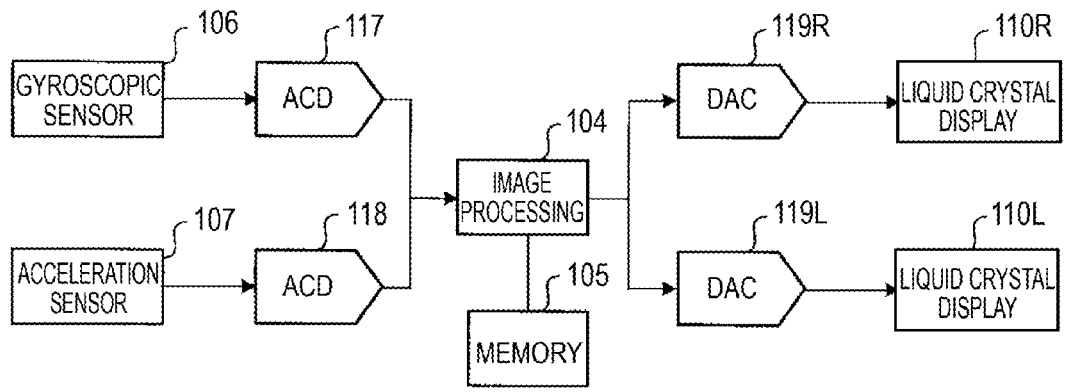
FIG. 5 is a block diagram showing an exemplary hand-shake correction configuration of the electronic binoculars according to the embodiment of the invention.

The configuration for making hand-shake correction will next be described with reference to FIG. 5.

Data detected by the gyroscopic sensor 106 and the acceleration sensor 107 are digitized by analog/digital converters 117 and 118, respectively, and the converted digital data are supplied to the image processor 104, where the supplied sensor data along with the swinging state of the housing 120, which is the body of the electronic binoculars 100, are used to determine the hand-shake state. The captured image data undergo image processing according to the determined hand-shake state in the image processor 104. In the image processing, image data representing a previous frame stored in the memory 105 may be used in some cases. An example of the image processing for hand-shake correction will be described later in detail.

An exemplary configuration of the sliding mechanism 109, which adjusts the distance between the right and left liquid crystal displays 110L, 110R, will be described with reference to FIGS. 6A and 6B.

Figure 6A:
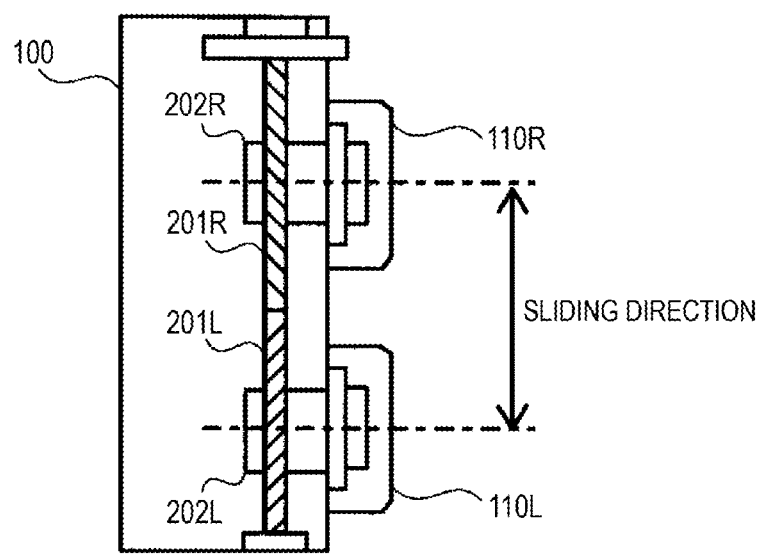
FIGS. 6A and 6B explain an example of a linear sliding mechanism of the electronic binoculars according to the embodiment of the invention.
Figure 6B:
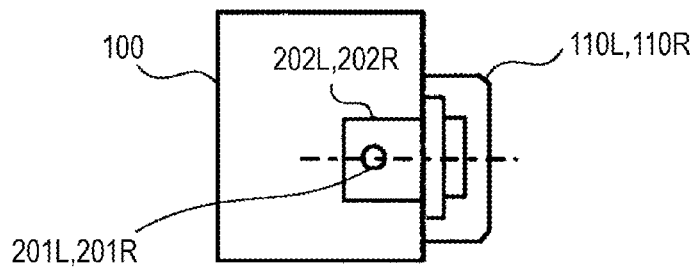

FIG. 6A is a transverse cross-sectional view of the electronic binoculars 100 taken along the horizontal direction (transverse direction), and FIG. 6B is a longitudinal cross-sectional view of the electronic binoculars 100 taken along the vertical direction (longitudinal direction). FIGS. 6A and 6B show only the mechanism related to the sliding mechanism 109.

The sliding mechanism 109 has screws 201L and 201R integrally disposed in series in the transverse direction, as shown in FIG. 6A. The integrated screws 201L and 201R can be rotated by a drive mechanism (not shown). It is noted that the directions in which the screws 201L and 201R are threaded are opposite to each other. The drive mechanism may be driven by a motor or manually rotated by the user.

The screw 201L disposed on the left side fits into a slidable member 202L to which the liquid crystal display 110L is attached, and rotating the screw 201L changes the position of the slidable member 202L (that is, the position of the liquid crystal display 110L) along the screw 201L. Similarly, the screw 201R disposed on the right side fits into a slidable member 202R to which the liquid crystal display 110R is attached, and rotating the screw 201R changes the position of the slidable member 202R (that is, the position of the liquid crystal display 110R) along the screw 201R.

Since the directions in which the screws 201L and 201R are threaded are opposite to each other, the two liquid crystal displays 110L and 110R slide and separate from each other (or approach) in accordance with the direction in which the screws 201L and 201R are rotated. The user can therefore arbitrarily adjust the distance between the two liquid crystal displays 110L and 110R.

The principle on which the autofocus adjustment is carried out will now be described with reference to FIG. 7 and FIGS. 8A and 8B.

Figure 7:
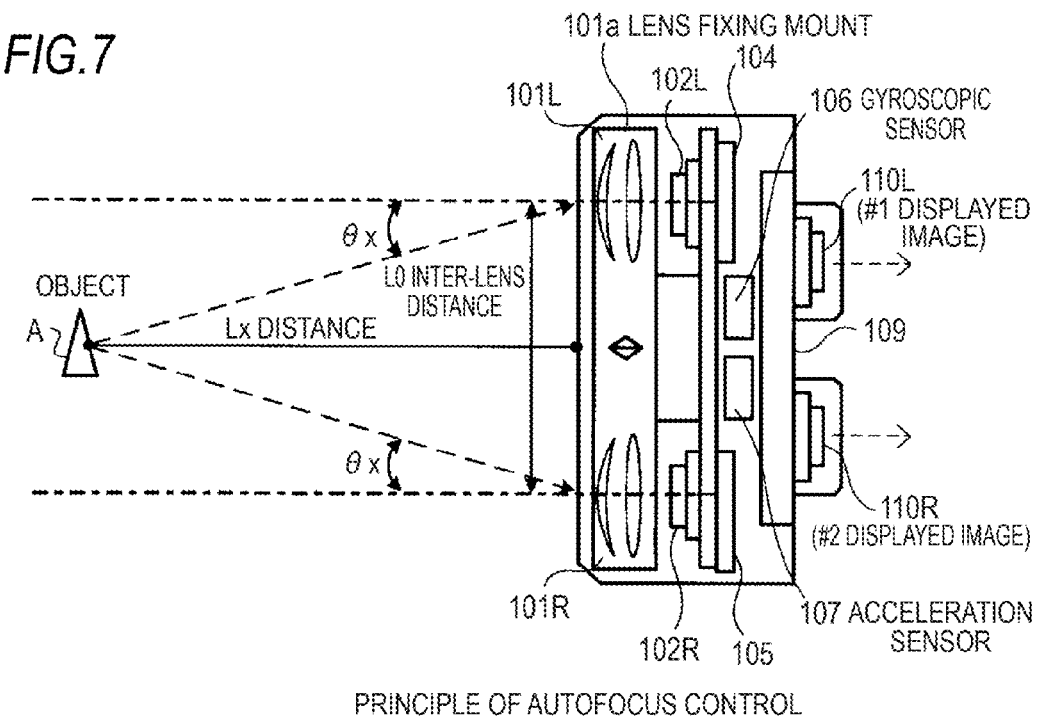
FIG. 7 explains the principle of autofocus control used in the electronic binoculars according to the embodiment of the invention is performed.

FIG. 7 shows exemplary processes for focusing the electronic binoculars 100 on an object A present in a position spaced apart from the electronic binoculars 100 by a predetermined distance Lx. FIG. 8A shows a displayed image #1 obtained by supplying the image signal captured by the left imaging unit 102L to the liquid crystal display 110L and displaying the image signal thereon. FIG. 8B shows a displayed image #2 obtained by supplying the image signal captured by the right imaging unit 102R to the liquid crystal display 110R and displaying the image signal thereon.

Now, let L0 be the distance between the two lens systems 101L and 101R, as shown in FIG. 7. The inter-lens distance L0 and the distance Lx from the electronic binoculars 100 to the object A determine the angle θx between each of the optical axes of the lens systems 101L, 101R and the direction toward the object. The distance Lx from the electronic binoculars 100 to the object A can therefore be calculated by determining the angle θx, because the inter-lens distance L0 is fixed.

Figure 8A:
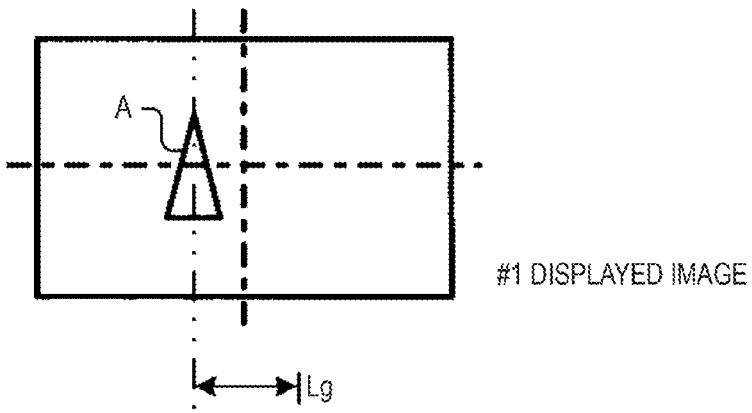
FIGS. 8A and 8B explain exemplary displayed images produced by the electronic binoculars according to the embodiment of the invention.
Figure 8B:
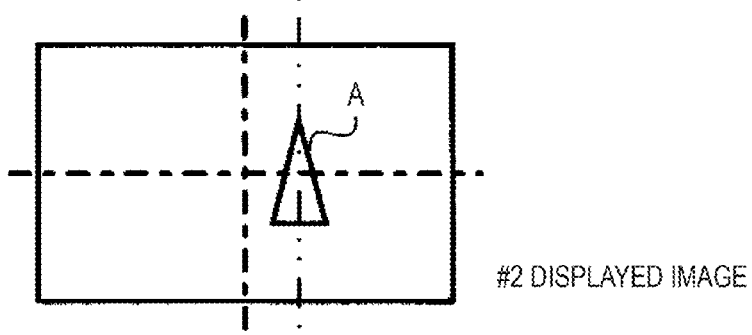

Specifically, the discrepancy Lg between the positions of the object A in the two displayed images corresponds to the angle θx, as shown in FIGS. 8A and 8B, and the discrepancy Lg can be converted into the angle θx. The distance Lx to the object A shown in FIG. 7 is then calculated.

The thus calculated distance Lx is used as the target value to carry out the focusing processes in the processing system that has been described with reference to FIG. 4.

The autofocus adjustment will be described using a formula. The distance Lx can be calculated by using the following approximate equation:

$$\text{Distance } Lx = L0/\tan(\theta x), \quad \text{Equation (1)}$$

When the distance Lx is substantially greater than the interlens distance L0, the above equation is approximated as follows:

$$\tan(\theta x) \approx K0 \times Lg, \quad \text{Equation (2)}$$

where K0 is a positive integer determined in accordance with the magnification of the lens.

Therefore, the distance Lx is given by the following equation:

$$\text{Distance } Lx = L0/(K0 \times Lg), \quad \text{Equation (3)}$$

In the present embodiment, the distance to the object is calculated based on the equation (3), and the object is automatically identified, for example, by carrying out the processes described later with reference to the example shown in FIG. 9. Therefore, even when the extracted object moves at high speed in the field of view, it is possible to follow the object and keep it in focus.

Identification of an object and a background image and image processing based on the identification performed in the electronic binoculars 100 of the present embodiment will be described with reference to FIG. 9 to FIGS. 15A to 15D.

First, the principle on which an object is distinguished from a background image will be described with reference to FIG. 9 and FIGS. 10A to 10C.

Figure 9:
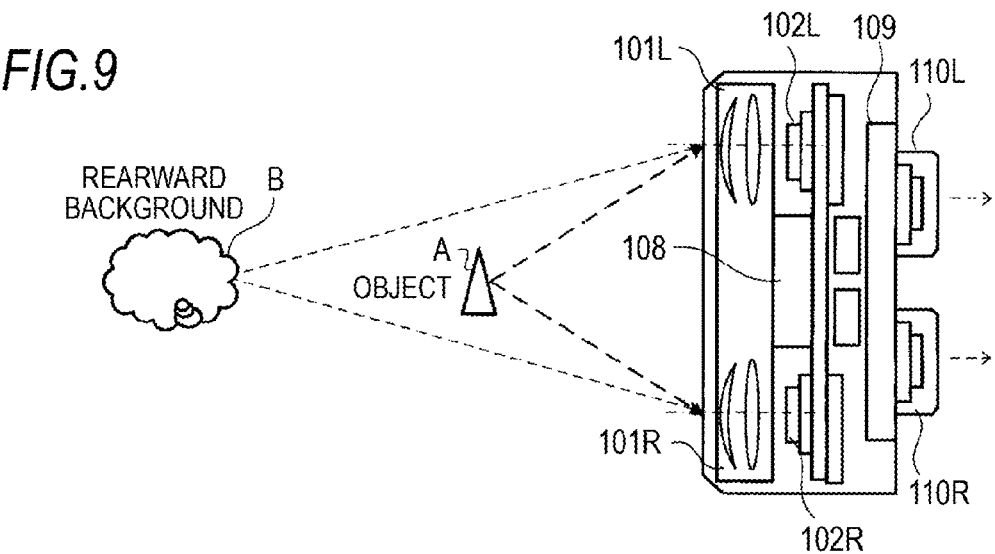
FIG. 9 explains the principle on which the background and an object are automatically identified in the electronic binoculars according to the embodiment of the invention.

FIG. 9 shows a state in which an object A and a rearward background B are imaged by the imaging units 102L and 102R and viewed through the electronic binoculars 100. It is assumed that the object A is located in a substantially central portion in the field of view of the electronic binoculars 100.

Figure 10A:
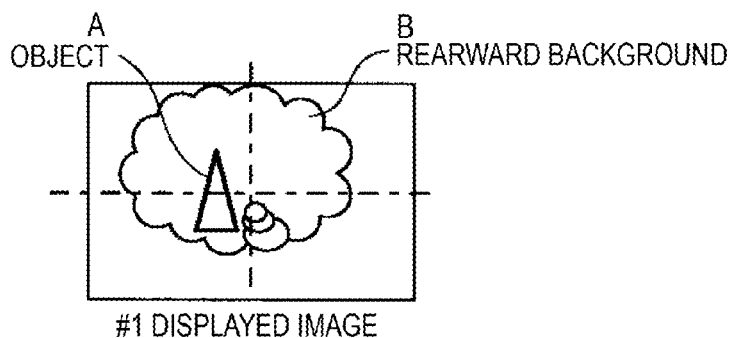
FIGS. 10A to 10C explain exemplary displayed images acquired in the example shown in FIG. 9.

In this case, the image (displayed image #1) captured by the left imaging unit 102L and displayed on the liquid crystal display 110L has the object A displayed in front of the rearward background B, as shown in FIG. 10A. In the displayed image #1, the object A is displayed in a position slightly to the left of the center.

Figure 10B:
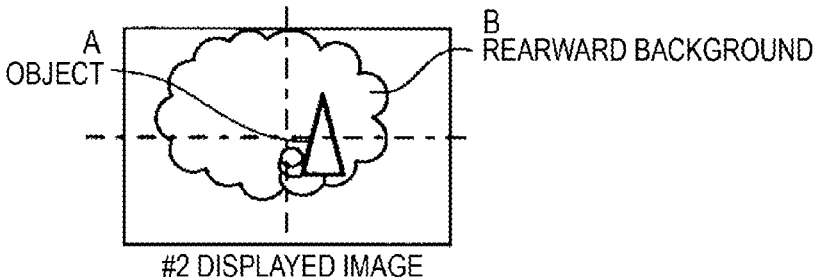

The image (displayed image #2) captured by the right imaging unit 102R and displayed on the liquid crystal display 110R has the object A displayed in front of the rearward background B, as shown in FIG. 10B. In the displayed image #2, the object A is displayed in a position slightly to the right of the center.

Figure 10C:
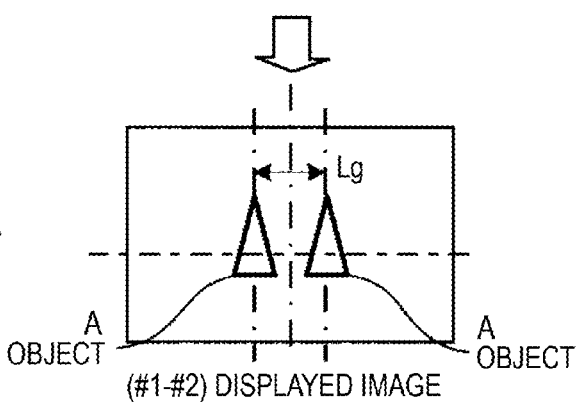

After the two displayed images #1 and #2 are obtained, one of the two images is subtracted from the other in the image processor 104 to remove the rearward background B common to the two images and produce an image containing only the object A, as shown in FIG. 10C. However, since the resultant image shows two objects A spaced apart from each other by the distance Lg, as shown in FIG. 10C, the two objects A are separated, and images each of which has the corresponding object A are displayed on the liquid crystal displays 110L and 110R.

As described above, providing the mode in which the background image is removed and performing the relevant image processing in the image processor 104 allow the background image to be removed and only the object to be displayed. The user is therefore provided with a very easy-to-see display mode because only the object is displayed. Further, removing the background image and extracting the object allow the object image to be readily identified, whereby the object can be identified and the distance to the object can be quickly calculated.

The principle of automatic identification of an object neighborhood and an object will be next described with reference to FIG. 11 and FIGS. 12A to 12C.

Figure 11:
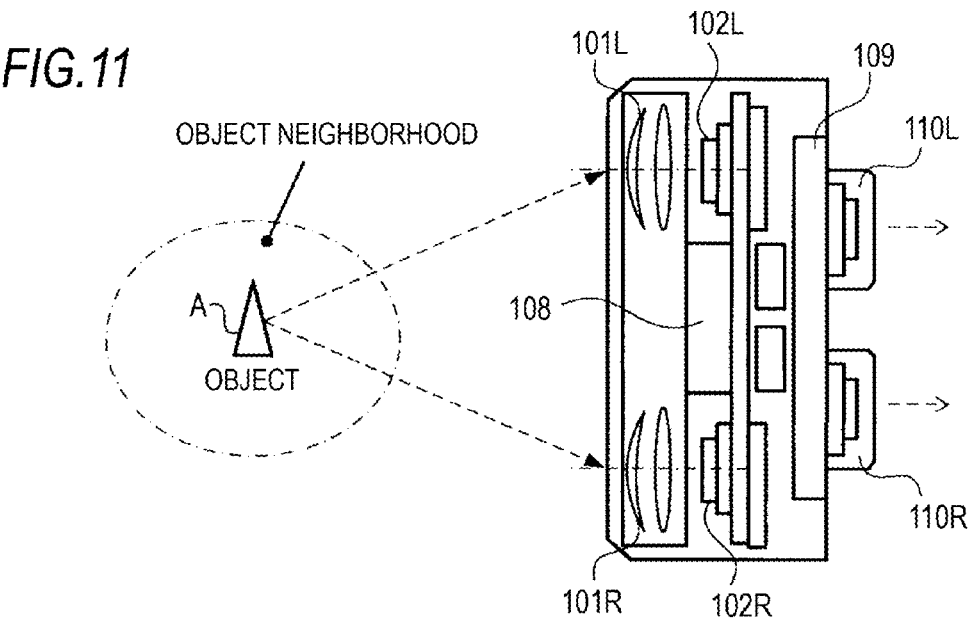
FIG. 11 explains the principle of automatic identification of an object neighborhood and an object in the electronic binoculars according to the embodiment of the invention.

FIG. 11 shows a state in which the imaging units 102L and 102R image an object A. In this example, it is again assumed that the object A is located in a substantially central portion in the field of view of the electronic binoculars 100.

Figure 12A:
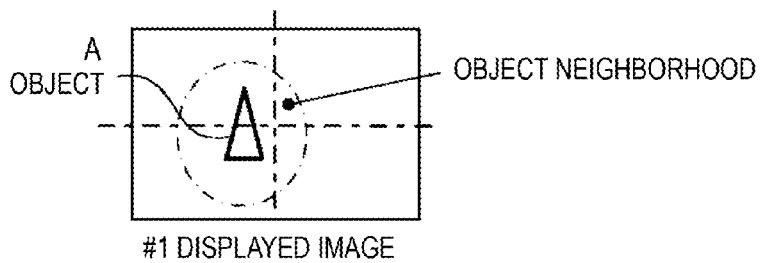
FIGS. 12A to 12C explain exemplary displayed images acquired in the example shown in FIG. 11.

FIG. 12A shows an image (displayed image #1) captured by the left imaging unit 102L and displayed on the liquid crystal display 101L in the case described above.

Figure 12B:
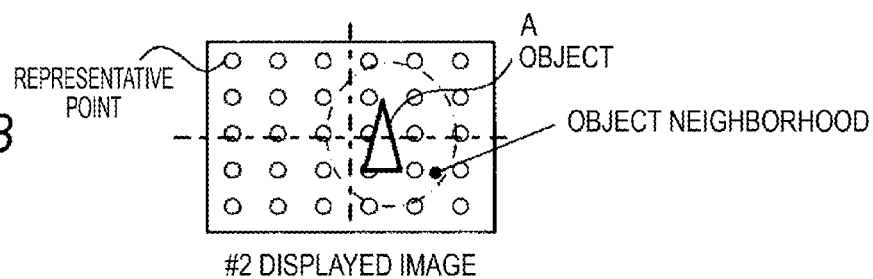

An image (displayed image #2) captured by the right imaging unit 102R and displayed on the liquid crystal display 110R has the object A in front of the rearward background B, as shown in FIG. 12B. The conditions described above are the same as those shown in FIG. 9.

Figure 12C:
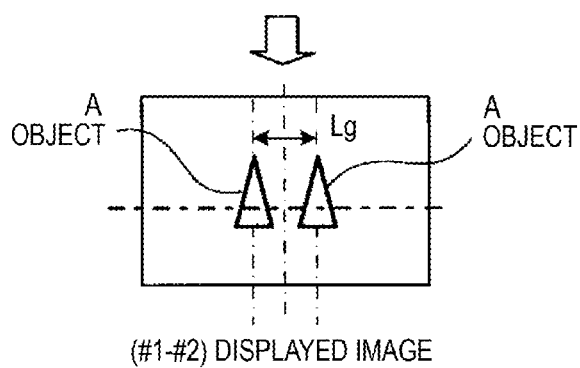

After the two displayed images #1 and #2 are obtained, one of the two images is subtracted from the other in the image processor 104 to remove the rearward background B common to the two images and produce an image containing only the object A, as shown in FIG. 12C. In the present example, not only the image of the object A but also the image of a neighborhood of the object A (part of the background image) are extracted and displayed, as indicated by the broken lines in the FIGS. 12A and 12B.

As an example of identifying an object in an image described above, for example, consider a case where a stadium is under observation. In general, a stadium has a flat ground having a uniform color, such as grass, in many cases. To extract an object under the condition, color analysis is performed on representative points (color information at 10 to 100 regularly arranged points) in the image data shown in FIGS. 12A and 12B. FIG. 12B shows an example of the representative points. The neighborhood color that is the color in a larger area is subtracted from the images shown in FIGS. 12A and 12B, whereby only the color of the object is left. Calculating the difference between the image data thus obtained from FIGS. 12A and 12B by subtracting one of the image data from the other allows only A to be extracted, as shown in FIG. 12C.

The positional discrepancy between the thus extracted object in the two images (Lg in FIG. 12C) can be used to calculate the distance to the object by using the equation (3) described above.

In practice, the image data only in the object neighborhood are processed to make the processing faster, whereby the computation time is reduced and realtime focusing is achieved.

Viewing region setting will next be described with reference to the images shown in FIGS. 13A to 13C.

FIG. 13A shows an image captured by the left imaging unit 102L, and FIG. 13B shows an image captured by the right imaging unit 102R. It is noted that the images shown in FIGS. 13A and 13B are not actual images but the difference between the right and left object positions is enhanced.

The object positioned slightly to the right of the center of the image imaged by the left imaging unit 102L as shown in FIG. 13A is the same as the object positioned slightly to the left of the center of the image imaged by the right imaging unit 102R as shown in FIG. 13B. In this description, the region where the object is present is called a viewing region.

The image signals produced by the two imaging units 102L and 102R are combined as appropriate in the image processor 104 in such a way that the viewing region is located at the center. FIG. 13C shows an example of the combined image.

The focusing adjustment is then carried out in such a way that the object in the viewing region is brought into focus. The processes that have been described with reference to FIG. 7 are used to determine the distance to the object and focus the binoculars on that position. Since the viewing position is likely in the vicinity of the center in the observation using binoculars, setting the viewing region and bringing that region into focus as described above allow the distance to a fast-moving object to be quickly calculated and the object to be brought into focus in real time.

The processes of extracting only the image within the viewing region set on a screen and displaying an image with the background removed will be described with reference to FIGS. 14A to 14C and FIGS. 15A to 15D.

FIG. 14A shows an image captured by the right imaging unit 102R, and FIG. 14B shows the right-side image from which a viewing region is extracted. FIG. 14C shows an example of the image of the viewing region from which the grass portion having a substantially uniform color is removed.

Similarly, FIG. 15A shows an image captured by the left imaging unit 102L, and FIG. 15B shows the left-side image from which the viewing region is extracted. FIG. 15C shows an example of the image of the viewing region from which the grass portion having a substantially uniform color is removed.

Subtracting one of the right-side object image shown in FIG. 14C and the left-side object image shown in FIG. 15C from the other provides an image with the background removed shown in FIG. 15D. The distance Lg, which corresponds to the difference between the two images, is thus detected. The distance Lg in the image is used to calculate the distance to the object, and a variety of image processing operations, including bringing the object into focus, can be performed.

An example of the hand-shake correction made in the electronic binoculars 100 of the present embodiment will be described with reference to FIG. 16 to FIGS. 23A to 23C.

First, FIG. 16 shows the principle of the hand-shake correction in the present embodiment. The X and Z axes shown in FIG. 16 are the horizontal and vertical axes of the scene imaged through the electronic binoculars 100. The X and Z axes may be determined from the output from the gyroscopic sensor 106, or may be determined by image processing performed on a captured image.

It is assumed that the X and Z axes obtained in the imaging process using the image sensors in the imaging units 102L and 102R in the electronic binoculars 100 are shifted by the amount of shake θr, as shown in FIG. 16.

In the hand-shake correction, a captured original images Vorg(xo,yo) is used to form a hand-shake corrected image Vcom(x, y), and the corrected image is displayed. The correction is made, for example, in the image processor 104 on an area set by cutting out part of the image in each frame formed by a captured image signal.

The process of converting the original image into an image with the amount of shake (θr) corrected to eliminate the effect of hand-shake will be described below by using a formula. The hand-shake angle θr is calculated by the following equation:

$$θr=θr0+f(ωr)dt$$

(In the equation, ωr represents the sensor signal, and θr0 represents the initial horizontal angle obtained from the acceleration sensor.)

The thus measured hand-shake angle θr is used to convert the coordinates of the original image data Vorg(xo,yo) into the coordinates of the hand-shake angle corrected image Vcom(x, y) by using the following equation:

$$L0=√(x0^2+y0^2)$$

$$Θ0=\arctan(x0/y0)$$

$$Vcmp(x,y)=Vorg(L0*\cos(Θ0+θr), L0*\sin(Θ0+θr))$$

In this way, image data with the hand-shake-related change corrected are obtained.

The shakes related to the shifts in the Z and Y axis directions can also be corrected on the same principle.

It is assumed in the present example that the hand-shake corrected image obtained as described above is an image in which the X and Z axes in the horizontal and vertical directions always coincide with the original X and Z axes. While the correction in the present example is described with reference to hand-shake correction, a state in which the electronic binoculars 100 that the user is holding is simply temporarily inclined may be similarly corrected by keeping the X and Z axes fixed.

An arrangement of the sensors necessary to make the hand-shake correction described above and the definition of the coordinates detected by the sensors will be described with reference to FIGS. 17A and 17B.

Figure 17A:
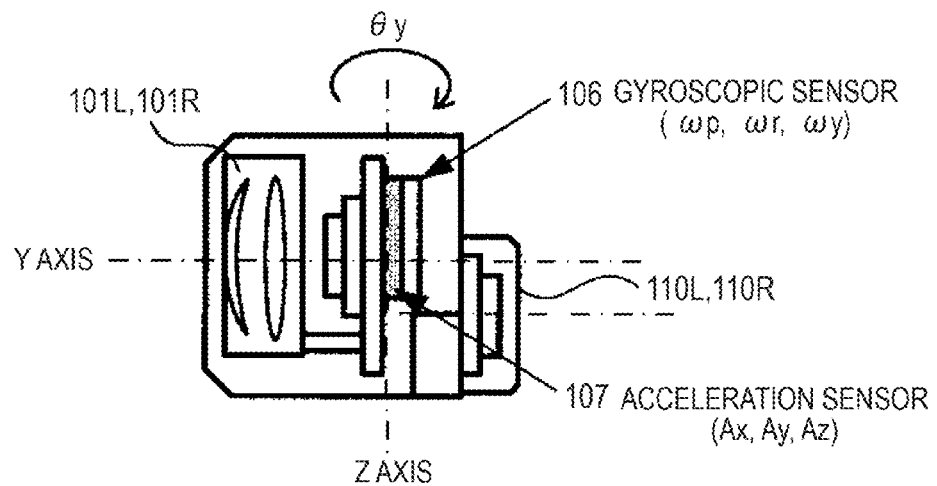
FIGS. 17A and 17B explain sensor arrangement and coordinate definition of the electronic binoculars according to the embodiment of the invention.
Figure 17B:
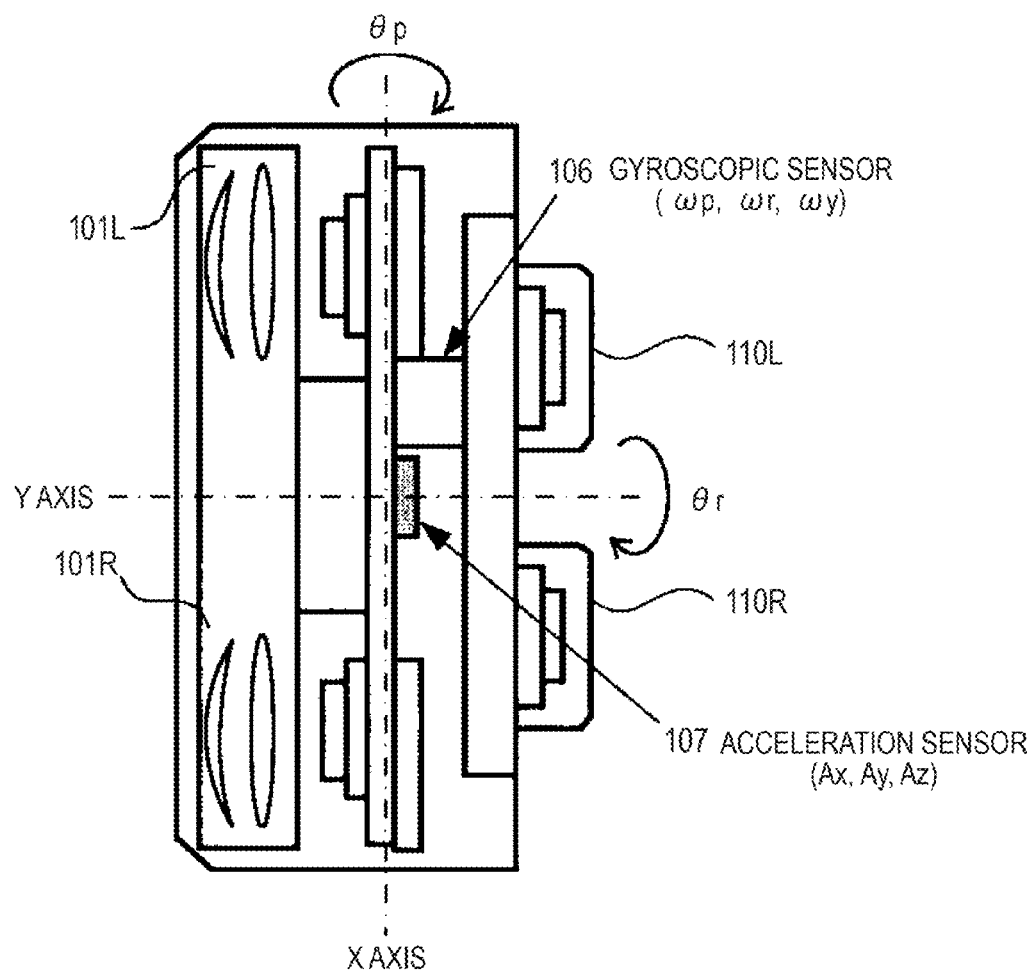

FIG. 17A is a longitudinal cross-sectional view of the electronic binoculars 100 showing the sensor arrangement, and FIG. 17B is a transverse cross-sectional view of the electronic binoculars 100 showing the sensor arrangement. In FIGS. 17A and 17B, the X axis represents the horizontal axis; the Y axis represents the optical axis; and the Z axis represents the vertical axis.

As shown in FIGS. 17A and 17B, the gyroscopic sensor 106 is disposed to detect the angular velocities (ωp, ωr, ωy) around the three axes. The acceleration sensor 107 is disposed to detect the angular acceleration values (Ax, Ay, Az) in the three axes.

That is, the gyroscopic sensor signal (ωp, ωr, ωy) from the three-dimensional gyroscopic sensor 106 incorporated in the electronic binoculars 100 and the three-dimensional acceleration sensor signal (Ax, Ay, Az) from the acceleration sensor 107 also incorporated therein can be used to detect the rotation angles (θp, θr, θy) and the angular velocities (ωp, ωr, ωy) of the binoculars.

The acceleration sensor 107 is configured in such a way that when the Z axis is stationary and coincides with the direction in which the gravity acts, the output from the acceleration sensor (Ax, Ay, Az) is 0 [V] (zero volts) and the polarities of the sensor outputs are reversed in accordance with the direction.

When the X and Y axes are stationary in the horizontal plane in FIGS. 17A and 17B, the three-dimensional gyroscopic sensor signal and the three-dimensional acceleration sensor signal for each dimension are set to 0 [V], and the polarities of the sensor signals are reversed in accordance with the direction. The pitch angle θp, the roll angle θr, and the yaw angle θy that form the rotation angle of the binoculars are calculated by using the following equation:

$$θp=θp0+f(ωp)dt, \text{ where } θp0 \text{ represents the initial pitch angle}$$

$$θr=θr0+f(ωr)dt, \text{ where } θr0 \text{ represents the initial roll angle}$$

$$θy=θy0+f(ωy)dt, \text{ where } θy0 \text{ represents the initial yaw angle}$$

The initial values θp0, θr0, and θy0 are determined by using the following equations along with the acceleration sensor signal in the stationary state.

$$\theta p0 = \arcsin(Ay)$$

$$\theta r0 = \arcsin(Ax)$$

$$\theta y0 = 0$$

The screen can be always displayed in the horizontal position by using the above equations to perform coordinate conversion in such a way that the image is always displayed in the horizontal position, as shown in FIG. 16, in response to the change in the rotation angle of the binoculars.

The correction described above is applicable to a case where each of the sensor signals has a frequency characteristic high enough to respond at a sufficiently high speed to the motion due to an actual hand-shake of the binoculars.

When the hand-shake motion is fast or the binoculars vibrate in the horizontal (vertical) direction, and the gyroscopic sensor 106 and the acceleration sensor 107 may not detect a shift, that is, the sensor output signals are very small, the image signals are used to detect a horizontal (vertical) shift, and images having undergone image conversion for shift correction are outputted in the form of video images. Video images of an object in question that are not affected by the vibration and shift of the binoculars are thus outputted. When a certain type of shift of the binoculars may not be detected by the sensors (the examples shown in FIGS. 19A, 19B and FIG. 20 described later), image/video information is used to reduce the effect of the shift of the binoculars.

FIG. 18 to FIGS. 23A to 23C show examples of the hand-shake correction.

Figure 18:
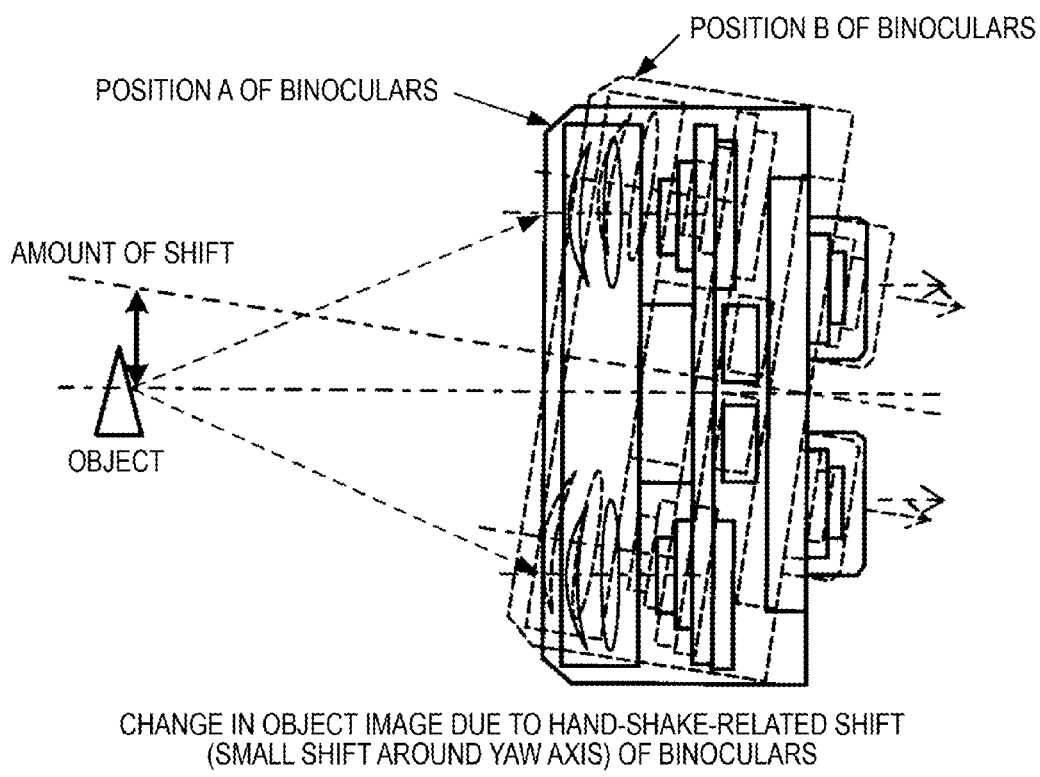
FIG. 18 explains an example showing how an object image changes due to a hand-shake-related shift (small shift around the yaw axis) of the electronic binoculars according to the embodiment of the invention.
Figure 19A:
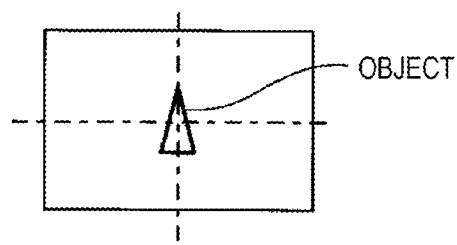
FIGS. 19A and 19B explain exemplary displayed images acquired in the example shown in FIG. 18.
Figure 19B:
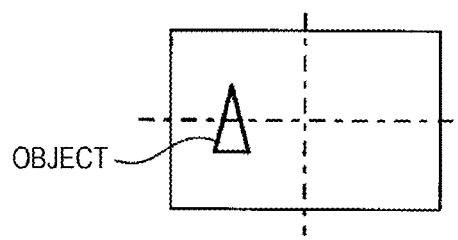

FIG. 18 shows a state in which a small shift occurs around the yaw axis (θy axis in FIG. 17A), and FIGS. 19A and 19B show how the produced image changes when no hand-shake correction is made. FIG. 19A shows an image produced when the electronic binoculars 100 are in a position A in FIG. 18, and FIG. 19B shows an image produced when the electronic binoculars 100 are in a position B in FIG. 18.

As seen from FIGS. 19A and 19B, an object A disadvantageously moves in the horizontal direction in response to the small shift.

Figure 20:
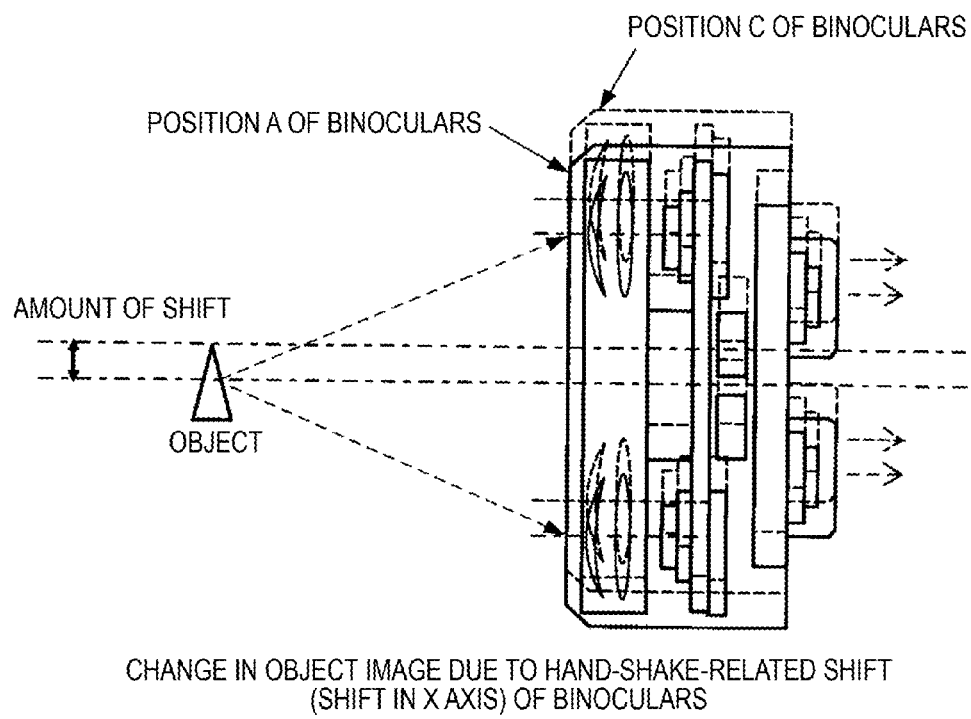
FIG. 20 explains an example showing how an object image changes due to a hand-shake-related shift (shift in the X axis) of the electronic binoculars according to the embodiment of the invention.
Figure 21A:
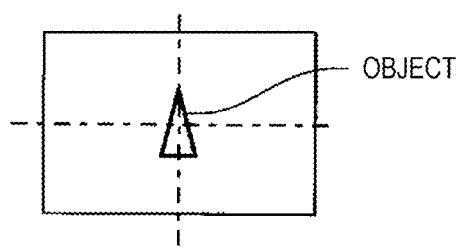
FIGS. 21A and 21B explain exemplary displayed images acquired in the example shown in FIG. 20.
Figure 21B:
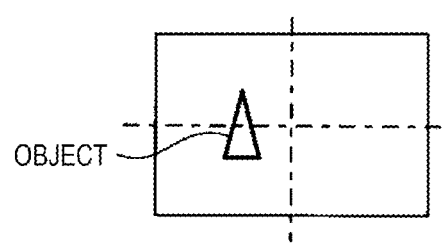

FIG. 20 shows a state in which the binoculars 100 translate in the transverse direction (horizontal direction) due to a hand-shake, and FIGS. 21A and 21B show how the produced image changes when no hand-shake correction is made. FIG. 21A shows an image produced when the electronic binoculars 100 are in the position A in FIG. 20, and FIG. 21B shows an image produced when the electronic binoculars 100 are in a position C in FIG. 20.

In the case shown in FIG. 20 as well, an object A in the image disadvantageously moves in the horizontal direction in response to the shift.

Figure 22:
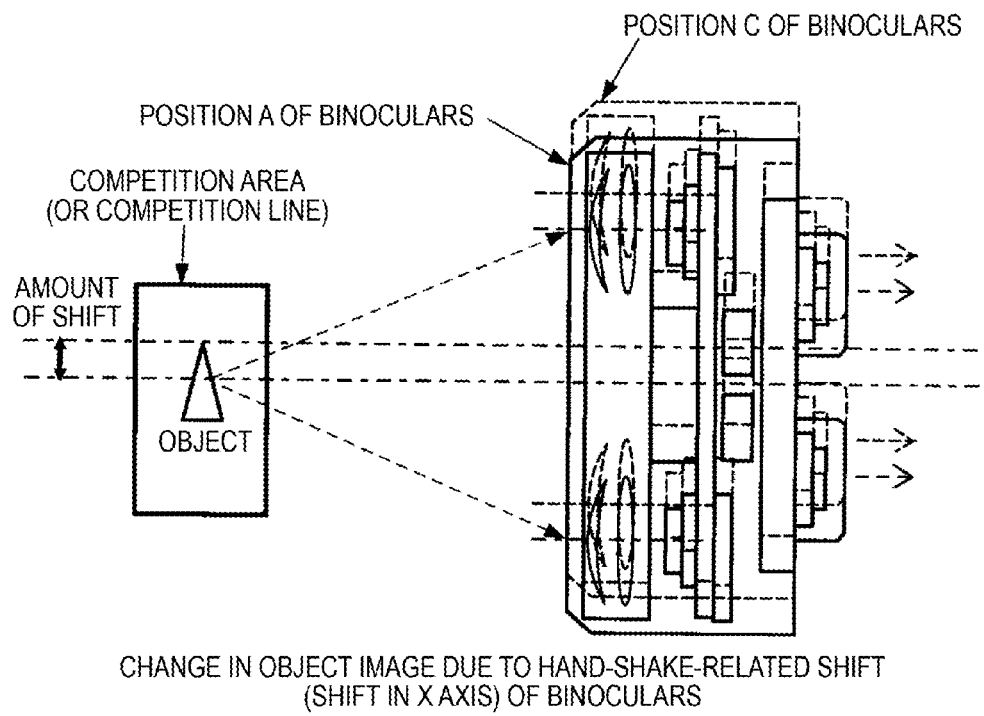
FIG. 22 explains an example showing how an object image changes due to a hand-shake-related shift (shift in the X axis) of the electronic binoculars according to the embodiment of the invention.

FIG. 22 shows a case where the binoculars translate as in the case shown in FIG. 20 when the user is in a stadium, for example, that shown in FIGS. 14A to 14C, and uses the electronic binoculars 100 to view an object A in a competition area (or inside a competition line) in the stadium.

Figure 23A:
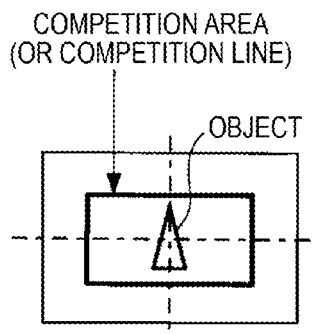
FIGS. 23A to 23C explain exemplary displayed images acquired in the example shown in FIG. 22.
Figure 23B:
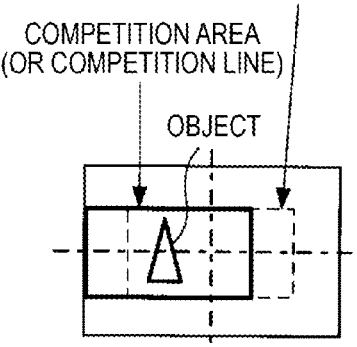

FIG. 23A shows a case where the binoculars 100 are in the position A in FIG. 22. In this case, the competition area is seen at the center, and the object A is displayed at the center of the competition area. FIG. 23B shows a case where the binoculars 100 are in the position C in FIG. 22 and no correction is made. In this case, the competition area is seen on the left, and the object A is also displayed on the left accordingly.

Figure 23C:
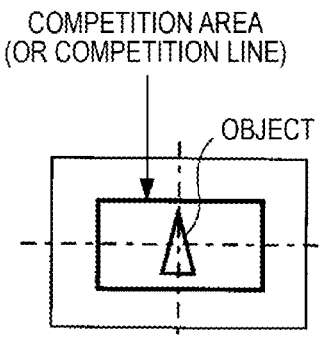

Making the hand-shake correction described in the present example allows the displayed image shown in FIG. 23C to be achieved. Specifically, the correction based on the principle shown in FIG. 16 allows the competition area to be seen at the center and the object A to be displayed at the center of the competition area, as in the case shown in FIG. 23A.

While the above figures show only the correction of the horizontal motion, the motions in the other directions are similarly corrected.

A description will be made of an example showing how the processes described above are carried out when the electronic binoculars 100 are actually used for observation with reference to the timing charts in FIGS. 24A to 24E and FIGS. 25A to 25E.

FIGS. 24A to 24E show a case where not only the autofocusing in which an object is automatically brought into focus but also the hand-shake correction are performed.

In the example shown in FIGS. 24A to 24E, the right and left imaging units 102L, 102R perform high-speed shuttering so that a single frame period of 1/30 seconds is achieved. In this example, the timing at which the right imaging unit 102R performs imaging as shown in FIG. 24A is the same as the timing at which the left imaging unit 102L performs imaging as shown in FIG. 24B.

FIG. 24C shows the change in the level of the sensor signal detected by each of the gyroscopic sensor 106 and the acceleration sensor 107, and a threshold of the sensor signal for judging whether an image blur occurs is set in advance, as indicated by the broken line.

FIG. 24D shows how the autofocus control and the hand-shake prevention control are carried out in the image processor 104 and its peripheral circuits. FIG. 24E shows the timing at which images are displayed on the right and left liquid crystal displays 110L, 110R.

As shown in FIG. 24D, the image signals captured in each frame cycle are stored in the memory and undergo the autofocus control and the hand-shake prevention control, and the processed image signals are read from the memory and displayed as shown in FIG. 24E. The displayed images are thus updated on a frame basis.

It is assumed in the example shown in FIGS. 24A to 24E that the acceleration or the angular acceleration becomes greater than the threshold at the timing of a frame period K and a hand-shake that is too large to be corrected occurs accordingly.

In this case, the images captured in a frame period K−1, which is one frame before the frame period K, and stored in the memory are read again in the frame period K and displayed on the liquid crystal displays 110L and 110R.

Thereafter, when the acceleration or the angular acceleration becomes smaller than the threshold in the following frame period K+1, the control returns to the display process using the signals captured in the frame period K+1. When the state in which the acceleration or the angular acceleration is greater than the threshold continues, the images captured and stored when the acceleration or the angular acceleration was smaller than or equal to the threshold value in the past are kept being displayed. It is noted, however, that the control may return to the display process using the current captured images after the state in which the acceleration or the angular acceleration is greater than the threshold has continued for a certain period.

FIGS. 25A to 25E are timing charts used in another example of imaging processes.

In the example shown in FIGS. 25A to 25E, a single frame period is set to 1/60 seconds, and what is called double-speed shuttering is performed to shift the imaging timing by 1/120 seconds between the right and left imaging units 102L, 102R.

That is, in this example, the timing at which the right imaging unit 102R performs imaging as shown in FIG. 25A is shifted by 1/120 seconds from the timing at which the left imaging unit 102L performs imaging as shown in FIG. 25B.

FIG. 25C shows the change in the level of the sensor signal detected by each of the gyroscopic sensor 106 and the acceleration sensor 107, and a threshold of the sensor signal for judging whether an image blur occurs is set in advance, as indicated by the broken line.

FIG. 25D shows the timing at which the image signals are held in the memory in preparation for image processing in the image processor 104. FIG. 25E shows the timing at which images are displayed on the right and left liquid crystal displays 110L, 110R.

As shown in FIG. 25D, the image signals captured in each frame cycle are held in the memory, undergo image processing, and are then displayed on the right and left liquid crystal displays 110L, 110R. The image signals captured at each timing are, for example, simultaneously supplied to the right and left liquid crystal displays 110L, 110R, and updates the images on the displays in the one-half cycle (a cycle of 1/120 seconds in this example). In FIG. 25D, the periods during which the autofocus control and the hand-shake prevention control are performed are omitted, but they can be performed in the same manner as in the example shown in FIG. 24D. The displayed images are thus updated on a frame basis.

It is assumed in the example shown in FIGS. 25A to 25E that the acceleration or the angular acceleration becomes greater than the threshold at the timing of a frame period K and a hand-shake that is too large to be corrected occurs accordingly.

In this case, the images captured by the other-side imaging unit in a frame period K−1, which is one frame before the frame period K, and stored in the memory are read again in the frame period K and displayed on the two liquid crystal displays 110L and 110R.

Thereafter, when the acceleration or the angular acceleration becomes smaller than the threshold in the following frame period K+1, the control returns to the display process using the signals captured in the frame period K+1.

As described above, performing what is called double-speed shuttering can effectively prevent blurred images due to a hand-shake from being displayed by temporarily displaying previous images in accordance with the state at the time of display. Further, performing the double-speed shuttering as shown in the present example is equivalent to imaging twice a frame even in the timing setting in which each of the imaging units performs imaging once a frame, whereby double-speed processing is achieved without increasing the amount of signal processing and power consumption necessary for the double-speed processing.

As described above, the electronic binoculars according to the present embodiment enables a sophisticated display operation different from that in electronic binoculars that has been proposed in related art. That is, performing not only the hand-shake correction but also the autofocusing enables a stable, well-defined display operation. Since the hand-shake correction is made by keeping the horizontal lines fixed, as shown in FIG. 16, the user who is looking at displayed images can view stable images displayed in a least blurred manner and comfortably follow an object in the field of view.

Further, performing the autofocusing using the distance between the two imaging units achieves appropriate focusing using an intrinsic configuration of the binoculars. In particular, since an object present in a substantially central portion in the field of view is identified and used in the focusing process, even a subject moving at high speed can be brought into focus in a satisfactory manner.

Moreover, since the present embodiment allows the background image to be removed and prevents it from being displayed, only an object can be displayed. Binoculars capable of comfortably viewing only a necessary object are thus provided.

The present application contains subject matter related to that disclosed in Japanese Priority Patent Application JP 2008-159726 filed in Japan Patent Office on Jun. 18, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. Electronic binoculars comprising:
   first and second imaging units disposed in a housing, the first and second imaging units having a predetermined horizontal distance therebetween;
   optical members that guide image light beams to the first and second imaging units;
   a sensor that detects angular acceleration or acceleration acting on the housing;
   an image processor configured to process image signals produced by the first and second imaging units and operate on the image signals so as to produce corrected image signals in accordance with the angular acceleration or the acceleration detected by the sensor when the angular acceleration or the acceleration is less than a predetermined threshold; and
   first and second displays with a horizontal distance therebetween disposed in the housing, the first and second displays configured to display the corrected image signals processed by the image processor,
   wherein for a frame period in which the angular acceleration or the acceleration is greater than the predetermined threshold, the image processor is further configured to select from memory and for display on the first and second display for the frame period images previously captured by the first and second imaging units.

2. The electronic binoculars according to claim 1, wherein the corrected image signals keep a horizontal direction of images displayed on the first and second displays oriented in a fixed direction when the housing is inclined.

3. The electronic binoculars according to claim 1, wherein the image processor is further configured to remove background images from the image signals captured by the first and second imaging units, and to display object images with the background images removed on the first and second displays.

4. The electronic binoculars according to claim 3, wherein for each of the two images representing the image signals captured by the first and second imaging units, the image processor is further configured to identify a portion that has a small positional change as the background image and a portion that has a large positional change as the object image.

5. The electronic binoculars according to claim 4, wherein the processor is further configured to calculate a distance to an object in the object image, and to output a signal for adjusting the optical members so as to focus on the object.

6. The electronic binoculars according to claim 1, wherein the sensor comprises a three-dimensional acceleration sensor.

7. The electronic binoculars according to claim 6, wherein the corrected image signals compensate for one or both of a rotation and shift of the binoculars.

8. The electronic binoculars according to claim 1 configured to be worn as a pair of eyeglasses.

9. The electronic binoculars according to claim 6, wherein the correction of the produced image signals cancels a shifting motion of the binoculars.

10. The electronic binoculars according to claim 6, wherein the correction of the produced image signals cancels a rotating motion of the binoculars.

11. The electronic binoculars according to claim 1, wherein the corrected image signals comprise a portion of an area associated with the image signals produced by the first and second imaging units.

12. The electronic binoculars according to claim 1, wherein the first and second imaging units comprise CCD or CMOS image sensors, and the first and second displays comprise liquid crystal displays.

13. A method for correcting images for display in electronic binoculars, the method comprising:
   optically guiding, by optical elements of the binoculars, image light beams to first and second imaging units that are separated by a first distance and housed in the binoculars;
   producing, by the first and second imaging units, first and second image signals;
   detecting, with one or more sensors attached to the binoculars, angular and/or linear acceleration;
   receiving, by a processor attached to the binoculars, the first and second image signals and acceleration signals representative of the angular and/or linear acceleration;
   processing, when the acceleration signal is less than a predetermined threshold, the first and second image signals and the acceleration signals so as to digitally convert the first and second image signals to corrected image signals, wherein the corrected image signals compensate for motion detected by the one or more sensors;
   displaying, on first and second displays, the corrected image signals; and
   selecting from memory, when the acceleration signal is greater than a predetermined threshold for a frame period, images previously captured by the first and second imaging units for display on the first and second display for the frame period.

14. The method of claim 13, wherein the corrected image signals comprise a portion of an area associated with the image signals produced by the first and second imaging units.

15. The method of claim 13, further comprising:
   alternating the timing of image capture for the first and second imaging units;
   processing each alternately captured first and second image signal sequentially; and
   displaying each processed first and second image signal sequentially on both first and second displays so as to double the image updating rate.

16. The method of claim 13, further comprising storing the first and second image signals in memory.

17. The method of claim 16, further comprising:
   removing background images from the first and second image signals; and
   displaying, on the first and second displays, object images with the background images removed.

* * * * *